United States Patent [19]

Baldwin

[11] Patent Number: 4,482,827
[45] Date of Patent: Nov. 13, 1984

[54] AXIALLY AND RADIALLY COMPACT FULL WAVE RECTIFIER ASSEMBLY FOR AN ALTERNATOR

[75] Inventor: Jeffrey D. Baldwin, Rockford, Ill.

[73] Assignee: Sundstrand Corporation, Rockford, Ill.

[21] Appl. No.: 507,511

[22] Filed: Jun. 24, 1983

[51] Int. Cl.³ .......................................... H02K 19/38
[52] U.S. Cl. ................................ 310/68 D; 310/112; 363/145
[58] Field of Search .................. 310/68 R, 68 D, 46, 310/112, 113, 180, 42, 72, 261, 67; 322/28, 87; 363/145

[56] References Cited

U.S. PATENT DOCUMENTS

| | | | |
|---|---|---|---|
| 2,634,379 | 4/1953 | Brainard | 310/112 |
| 2,972,711 | 2/1961 | Sorokin et al. | 317/234 |
| 3,010,040 | 11/1961 | Braun | 310/112 |
| 3,295,046 | 12/1966 | Margaira | 321/8 |
| 3,329,841 | 7/1967 | Binder et al. | 310/68 |
| 3,354,330 | 11/1967 | Storsand | 310/68 |
| 3,368,091 | 2/1968 | Layman | 310/68 |
| 3,412,271 | 11/1968 | Hall | 310/68 R |
| 3,684,944 | 8/1972 | Evgrafov et al. | 321/8 |
| 3,739,209 | 6/1973 | Drabik | 310/68 D |
| 3,927,338 | 12/1975 | Vieilleribiere | 310/68 D |
| 3,959,676 | 5/1976 | Striker | 310/68 D |
| 4,052,629 | 10/1977 | Küter | 310/68 D |
| 4,059,778 | 11/1977 | Sohnle | 310/68 D |
| 4,176,242 | 11/1979 | Linscott, Jr. | 174/52 H |
| 4,191,902 | 3/1980 | Yarrow | 310/68 D |
| 4,232,238 | 11/1980 | Saito et al. | 310/68 D |

FOREIGN PATENT DOCUMENTS 291288  1/1971  U.S.S.R. .......................... 310/68 D

Primary Examiner—J. D. Miller
Assistant Examiner—D. L. Rebsch
Attorney, Agent, or Firm—Wood, Dalton, Phillips, Mason & Rowe

[57] ABSTRACT

An axially and radially compact rectifier assembly for installation in alternator rotors includes two spaced plates, each mounting diodes which extend axially toward the opposite plate, on which they are not mounted. The axial extension of the diodes provides for radial compactness. The diodes on each plate are staggered with respect to the diodes on the other plate so that they may nest between one another, to provide axial compactness as well.

8 Claims, 9 Drawing Figures

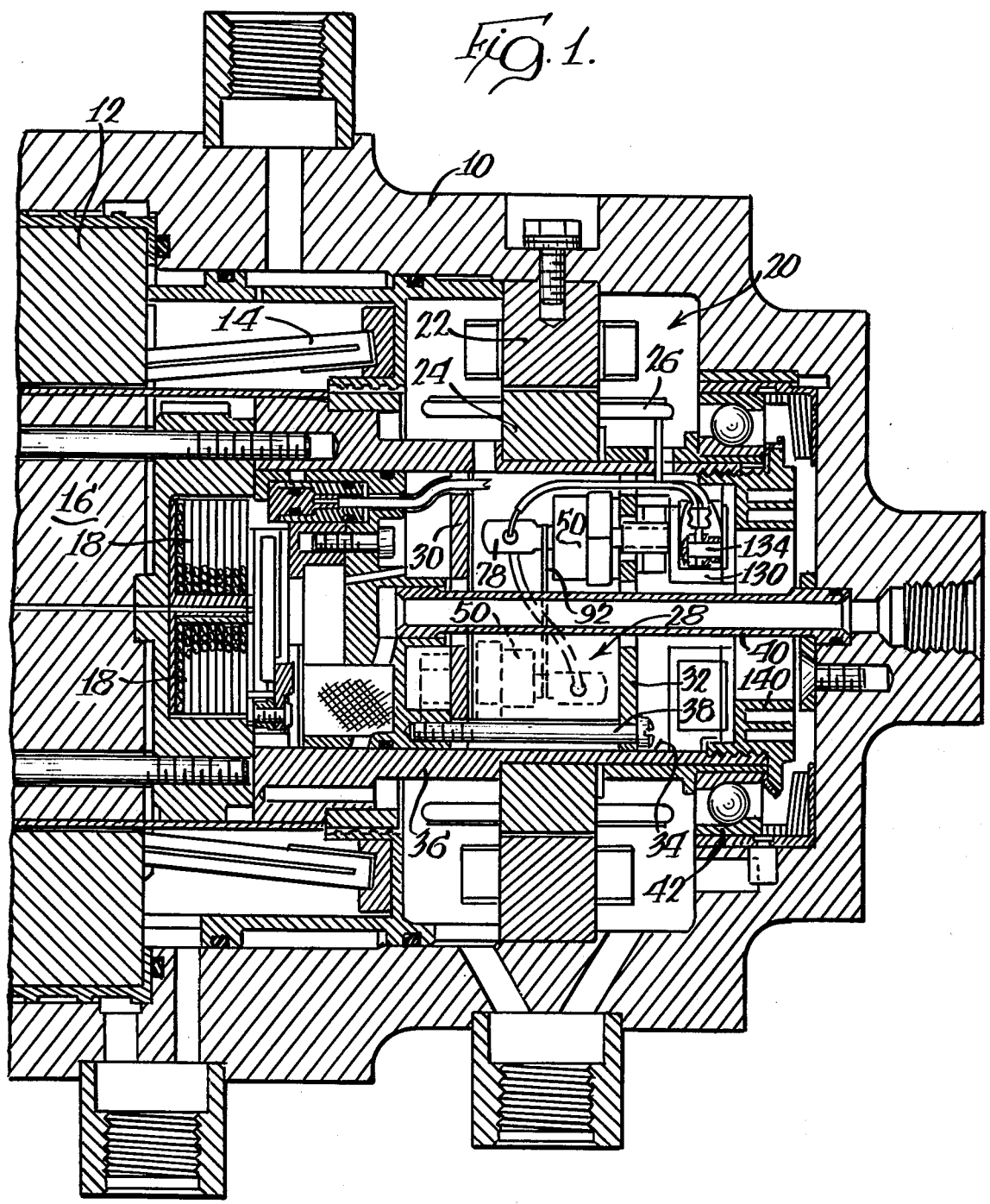

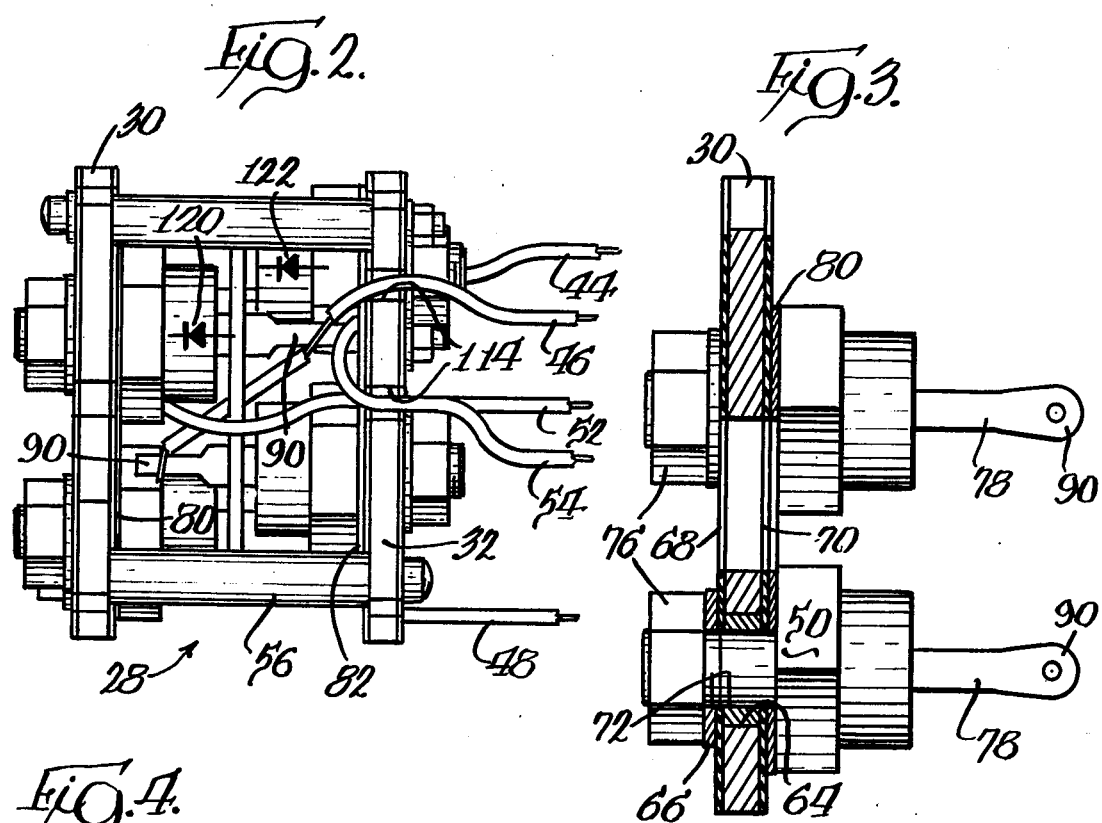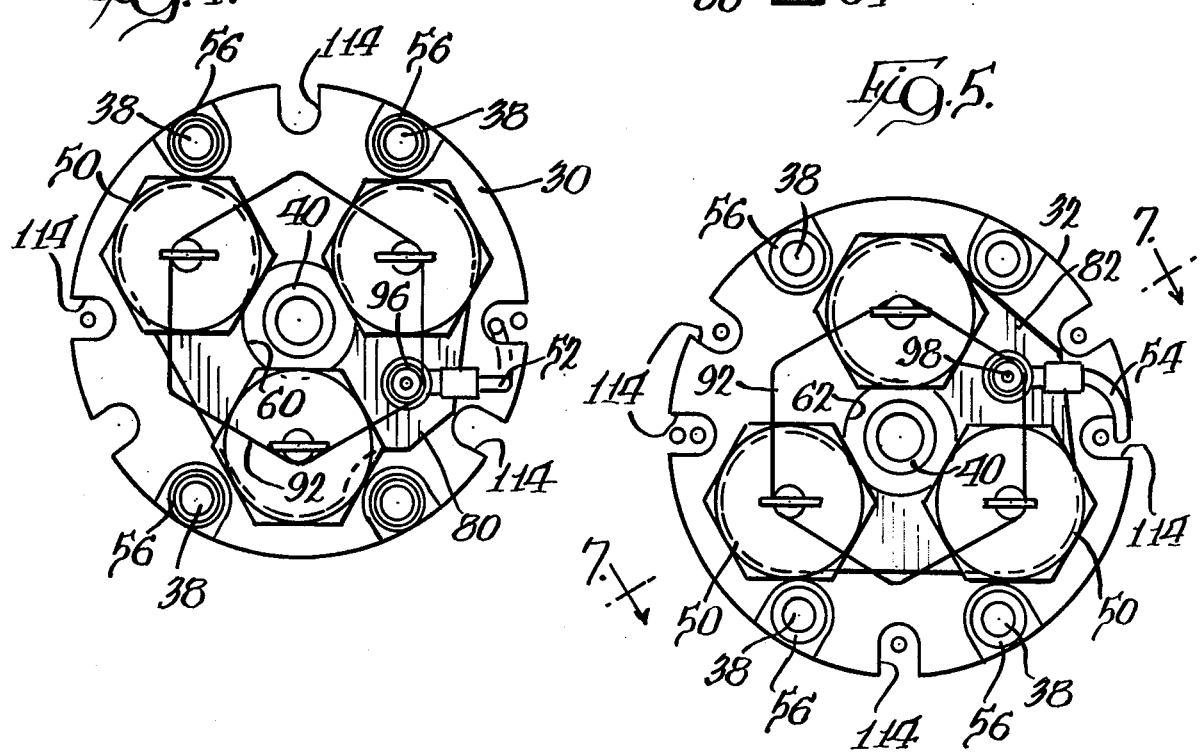

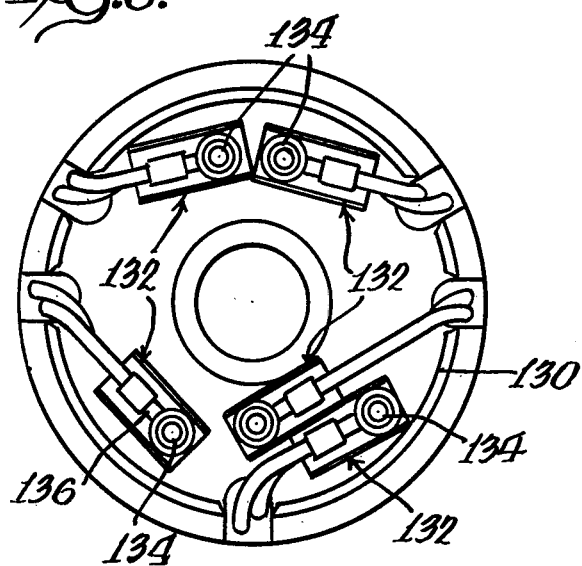
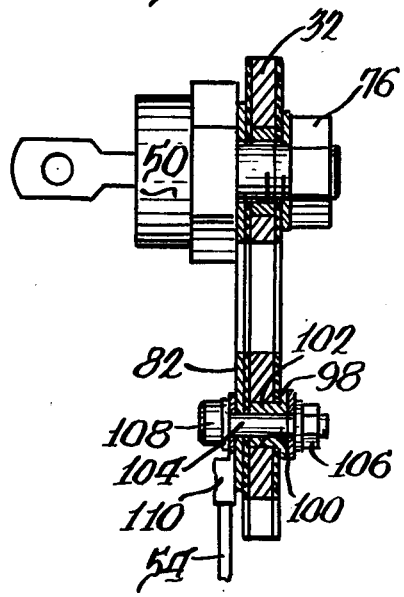
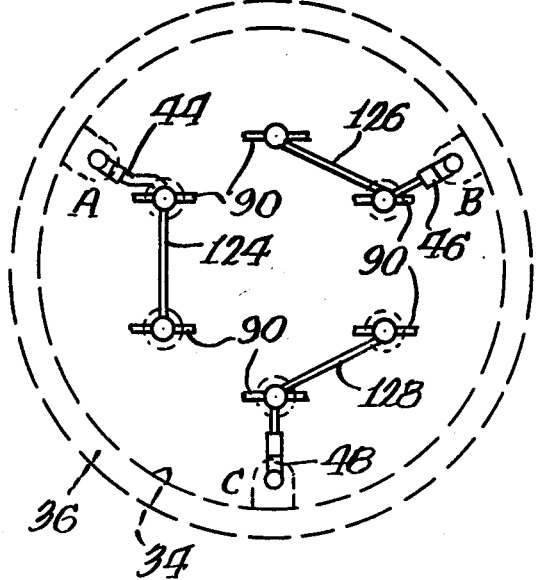
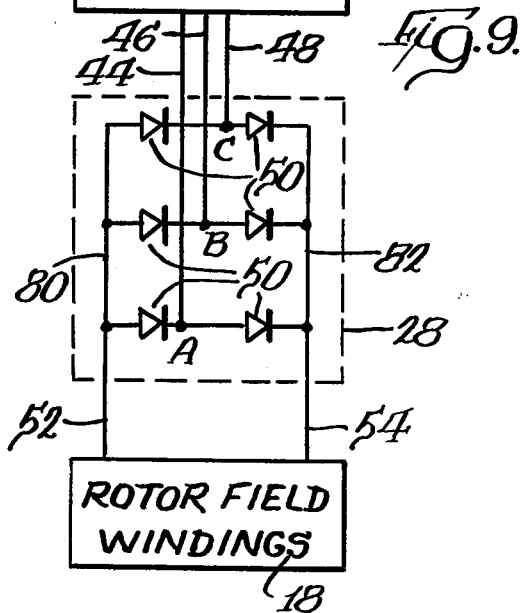

4,482,827

AXIALLY AND RADIALLY COMPACT FULL WAVE RECTIFIER ASSEMBLY FOR AN ALTERNATOR

TECHNICAL FIELD

This invention relates to a rectifier assembly, and more specifically, to an axially and radially compact rectifier assembly that may be incorporated in the rotor of an alternator or the like.

BACKGROUND ART

Full wave rectifier assemblies have long been employed with rotary electric machines as, for example, alternators. In many cases, for any of a variety of reasons, it is desirable that such machines be of the so-called "brushless" variety. Where such is desired, it is necessary that the magnetic field be produced in the rotor so that induced current may be taken from stator windings, thereby eliminating the need for brushes in the electrical circuit for the induced current.

This in turn requires that the means for producing the magnetic field be carried by the rotor. This can, of course, be accomplished through the use of permanent magnets, but where the machine is to be of relatively high capacity, the necessarily more intense magnetic field is provided by directing direct current through windings carried by the rotor. To provide such current to rotor windings and yet omit brushes, it therefore becomes necessary to generate electric current for energizing the rotor windings within the rotor itself, that is, by means of a so-called "exciter".

In the usual case, the exciter includes a stationary magnet stator and the same induces the exciter current in additional windings carried by the rotor. Conveniently, the arrangement is one of an alternator with the result that alternating current is generated. In order to provide a direct current to the rotor windings, it is necessary that the alternating current be rectified. And again, to avoid the use of brushes, the rectifier for performing such an operation must be carried by the rotor.

Over the years, a variety of rectifier assemblies to be carried by rotors have been developed. Examples are shown in U.S. Pat. Nos. 3,368,091 issued Feb. 6, 1968 to Layman; 3,412,271 issued Nov. 19, 1968 to Hall; and 3,739,209 issued June 12, 1973 to Drabik. One necessary characteristic of such assemblies is that they be able to withstand the high stresses imposed upon them by centrifugal force during rotor rotation. Another characteristic required of such rectifier assemblies is that they be as compact as possible. This is necessary since they are carried by the rotor, and any unnecessary increase in rotor size is undesirable since (a) it will necessarily increase the size of the stator, and thus the size of the overall machine, and (b) an increase in size will quite likely result in an increase in mass with the larger mass of the rotor increasing the stresses present during operation.

Heretofore, when it has been attempted to make a rectifier assembly axially compact, it has generally been accomplished at the expense of an increase in the radial dimension of the assembly. This in turn has generally resulted in rectifier assembly components being located a greater distance from the axis of rotation than is desirable, with the consequence that, for a given rotor speed, the centripetal velocity of such components is greater than would be the case if they were located more radially inwardly. As an ultimate result, such radially outwardly located components are subject to greater stresses induced by centrifugal force. The rectifier assemblies illustrated in the previously identified Layman and Drabik patents are subject to this difficulty.

Conversely, when it it has been attempted to avoid the problems imposed by such structures by making the assembly radially compact as, for example, illustrated in the previously identified Hall patent, such is accomplished at the expense of an increased axial dimension. As can be appreciated from the illustration in the Hall patent, this in turn requires either a radial or an axial increase in that portion of the rotor in which the magnetic field is generated or a reduction in the amount of magnetic material that can be carried by the rotor, and thus a decrease in generating efficiency.

The present invention is directed to overcoming one or more of the above problems.

DESCRIPTION OF THE INVENTION

It is the principal object of the invention to provide a new and improved rectifier assembly for a alternator and more specifically, to provide such a rectifier assembly which is both axially and radially compact.

An exemplary embodiment of the invention includes a pair of generally parallel mounting plates in spaced relation. Each of the plates has a plurality of apertures, the apertures in one plate being non-aligned with the apertures in the other plate. There are provided a plurality of diodes, one for each of the apertures. Each diode has a base forming one pole of the electrical circuit of the diode which is received in an associated aperture in a corresponding plate to be mounted thereon. Each diode further includes a terminal forming the other pole of the electrical circuit which is directed oppositely of the corresponding base and axially toward the plate on which the corresponding diode is not mounted. The spacing between the plates is such that the terminals of the diodes on one of the plates nest between the terminals of the diodes on the other of the plates and are in close proximity to but out of contact with the plate other than that on which the associated diode is mounted. Means are provided for securing the plates in the foregoing spaced relation.

In a highly preferred embodiment, each of the plates has three apertures arranged to define an equilateral triangle and six diodes are employed.

Preferably, the plates are generally circular and at least one of the plates has radially outwardly opening recesses in its periphery. Electrical leads connected to the diodes between the plates extend axially outwardly of the plates through such recesses.

In a highly preferred embodiment, busses are located between the plates and each includes a terminal for receipt of such an electrical lead.

Generally speaking, each aperture in one plate will have an axial alignment with a point midway between two apertures on the other of the plates. Posts are employed for securing the plates together, such posts extending between the plates near the periphery thereof. The centers of the plates may have central apertures through which a conduit for as, for example, lubricating and/or cooling fluid, is adapted to pass.

Other objects and advantages will become apparent from the following specification taken in connection with the accompanying drawings.

BRIEF DESCRIPTION OF THE DRAWINGS

FIG. 1 is a fragmentary, sectional view of an alternator embodying a rectifier assembly made according to the invention;

FIG. 2 is an elevational view of the rectifier assembly removed from the alternator;

FIG. 3 is an enlarged, sectional view illustrating the mounting of diodes forming part of the rectifying assembly on a mounting plate as well as other components of the assembly;

FIG. 4 is a view of one mounting plate and associated components;

FIG. 5 is a view of another mounting plate and associated components;

FIG. 6 is an illustration of electrical leads and mounting terminals on a terminal board;

FIG. 7 illustrates additional detail of the mounting of a diode on a mounting plate as well as the provision of a terminal;

FIG. 8 is a somewhat schematic illustration of the electrical interconnection of components of the diodes employed in the rectifier assembly; and FIG. 9 is an electrical schematic illustrating the interconnection of alternator components with the rectifier assembly.

BEST MODE FOR CARRYING OUT THE INVENTION

A high speed alternator embodying a rectifier assembly made according to the invention is illustrated in the drawings and with reference to FIG. 1 is seen to include a housing 10. Within the housing 10 is a stator 12 having windings, only the end turns 14 of which are shown.

Mounted for rotation within the stator 12 is a rotor 16 which includes windings, only the end turns 18 of which are shown, for generating a magnetic field by the rotor 16. Consequently, upon rotation of the rotor 16 by means not shown, a current will be induced in the windings of the stator 12 which can be conducted to a point of use without the need for brushes in the apparatus. The alternator also includes an exciter, generally designated 20. The exciter 20 includes an exciter stator 22 and an exciter armature 24 mounted on and carried by the rotor 16. The armature 24 includes windings 26 in which a three phase alternating current is induced. This induced current is conducted to a full wave rectifier assembly made according to the invention, shown generally at 28, where it is rectified to direct current and fed to the rotor windings 18 to generate the aforementioned magnetic field. As seen in FIG. 1, the rectifier assembly 28 is basically bounded by two spaced, parallel plates 30 and 32 housed within in a cavity 34 in a shaft 36 forming part of the rotor 16. A plurality of bolts 38 (only one of which is shown) extend through the assembly 28 to secure the same in place axially. The peripheral wall of the cavity 34 snugly receives the assembly 28 to position the same radially. As will become more apparent hereinafter, the assembly 28 is constructed so that auxiliary components may extend through it so as to minimize the total spacial requirements of the alternator. For example, as seen in FIG. 1, a conduit 40 extends through the assembly 28. Typically, the conduit 40 will be employed to deliver a lubricant and/or coolant to the rotor 16 to cool the same during operation of the alternator and, in some instances, provide lubricant to bearings not shown.

The rotor 16 is, of course, journalled within the housing 10 by any suitable means. One set of bearings employed for such purpose is shown at 42. The alternator also includes lubricant and/or coolant ports, seals, etc. as illustrated in FIG. 1, as will be appreciated by those skilled in the art.

The electrical configuration relating to the present invention is illustrated in FIG. 9. As mentioned previously, the exciter windings 26 generate a three phase alternating current which is fed to the rectifier assembly 28 on three lines, 44, 46 and 48. These lines are connected to the common junctions of pairs of diodes 50 as illustrated in FIG. 9 and the non-common junctions of pairs of the diodes 50 are connected either to a line 52 or a line 54, which provide direct current to the rotor field windings 18 for generation of a magnetic field in the rotor as mentioned previously.

Turning now to FIG. 2, the assembly 28 is illustrated after it has been extracted from the rotor cavity 34. The plates 30 and 32 are generally parallel and maintained in the desired spaced relation by hollow posts 56. As best seen in FIGS. 4 and 5, there are provided four such posts 56, located about the rotational axis of the rotor 16 in symmetrical positions for balance purposes. The bolts 38 (see also FIG. 1) pass through the interior of the posts 56 as well as through apertures in the plates 30 and 32 to secure the assembly within the rotor cavity 34.

Also as seen in FIGS. 4 and 5, the plates 30 and 32 have generally circular peripheries. The plate 30 is provided with a central aperture 60 while the plate 32 has a similar central aperture 62. The apertures 60 and 62 are provided, to allow for passage of the conduit 40 through the assembly 28 as best illustrated in FIG. 1.

Each of the plates 30 and 32 is provided with three apertures such as the aperture 64 shown in FIG. 3. The apertures 64 are located radially outwardly of the center aperture 60. The three apertures 64 in each plate define an equilateral triangle. As seen in FIG. 3, each such aperture 64 is provided with an insulating bushing 66. Also as seen in FIG. 3, opposite sides of the plate 30 are provided with thin sheets of insulation 68 and 70. Similar insulation is provided on the plate 32, as well.

Each one of the bushings 66 in the associated aperture 64 receives the threaded base 72 of one of the diodes 50. Each diode 50 has an enlarged hexagonal formation 74 and nuts 76 threadably received on the base 72 together with the hex formation 74 mount, each diode to a respective one of the plates 30 and 32 in insulated relation with respect thereto.

As is well known, the base 72 of each diode 50 forms one pole of the internal diode circuit. A second pole of that circuit is formed by a terminal 78 extending oppositely of the base 72.

A thin metal plate 80 is located on the side of each plate 30 and 32 facing the other of the plates 30 and 32 so as to be within the assembly. The metal plate 80 is, of course, insulated from the associate plate 30 or 32 by the insulating sheet 70 but will be in electrical contact with the base 72 of the three diodes mounted on the involved plate by reason of being in contact with the hex formation 74 of each such diode 50. The plate 80 serves as a bus for the three diodes 50 mounted on the plate 30. As seen in FIGS. 2 and 5, a similar metallic plate 82 serves as a bus for the diodes 50 mounted on the plate 32.

As can be appreciated from a consideration of FIGS. 4 and 5 showing the axially inner faces of the plates 30 and 32 respectively, the apertures 64 receiving the diodes 50 in the plate 30 are non-aligned with the apertures in the plate 32. More particularly, an aperture 64 in the plate 30 is disposed so as to be aligned with a point midway between two of the apertures 64 and the plate 32. Moreover, the plates 30 and 32, with the diodes 50 assembled on it, are oriented such that the terminals 78 of the diodes on one plate extend toward the other plate to terminate at ends 90 in close proximity to, but out of contact with, the adjacent one of the plates 30 and 32. As a consequence of this relationship, the diodes 50 are all axially extending and the diodes 50 on one of the plates nest between the diodes on the other of the plates. The axial disposition of the diodes provides for radial compactness and the nesting relationship between diodes on the two plates provides for axial compactness.

In such a configuration, the diodes 50 are basically capable of withstanding the forces imposed upon them during rotation. However, to prevent any deformation of the terminals 78, which are perhaps the weakest part of each diode 50, a confining epoxy-impregnated wrap of non-conducting cord 92 is disposed about them as seen in FIGS. 1, 4 and 5. The cord 92 serves to equalize the radially outwardly operating centrifugal forces on each terminal 78 during operation such that all remain in an axially extending position without deflecting radially.

The bus 80 associated with the plate 30 includes a terminal 96 to which the electrical lead 52 (FIG. 9) may be connected. Similarly, the bus 82 (FIG. 5) has a generally identical terminal 98 to which the lead 54 may be connected.

Turning now to FIG. 7, the terminal 98 will be described with the understanding that the terminal 96 may be made identical thereto.

The mounting plate 32 includes a bore 100 through which an insulating bushing 102 extends. An Allen-headed cap screw 104 extends through the bushing 102 to receive a fastening nut 106 on the opposite side of the plate 32. The head 108 of the screw 104 is disposed between the plates 30 and 32 and clamps a crimped fastener 110 on the end of the lead 54 into electrically conducting contact with the bus 82.

Returning to FIGS. 4 and 5, it will be seen that at various intervals, the peripheries of the plates 30 and 32, as well as the insulating sheets thereon, include radially outwardly openings recesses or notches 114. As can be seen in FIG. 2, such notches 114 allow for axial passage of the electrical leads 44, 46, 48, 52 and 54 out of the space between the plates and within the radial profile of the assembly 28.

Returning to FIG. 2, it should be appreciated that while the diodes 50 on each of the plates 30 and 32 have identical exteriors, they are electrically of opposite polarity. Thus, the diodes 50 mounted on the plate 32 are conductive in conventional notation as designated by the symbol 120 in FIG. 2 while the diodes 50 mounted on the plate 30 are conductive in the opposite electrical direction as indicated in conventional notation by the symbol 122. With this relationship in mind, attention is now directed to FIG. 8. Electrical conductors 124, 126 and 128 interconnect the terminals 78 of two adjacent diodes 50, one such diode being mounted on the plate 32 and the other such diodes being mounted on the plate 30. Thus, the electrical conductor 124 may be connected to the lead 44; the conductor 126 connected to the lead 46; and the conductor 128 to the lead 48 to complete the wiring schematic illustrated in FIG. 9.

Returning to FIG. 1, the cavity 34 in the rotor shaft 36 may also house a terminal cup 130. The terminal cup 130 is illustrated in FIG. 1 and FIG. 6 and may be formed of insulating material. At locations such as those illustrated in FIG. 6, there may be located electrical connections 132, each accomplished with a threaded fastener 134 for receipt of apertured connectors 136 crimped on various ones of the leads. Insulating tubing may be used to electrically isolate each connection. A threaded element 140 in the nature of a spanner nut may be employed to partially close the cavity 34 of the rotor shaft 36 with the assembly 28 and the terminal cup 130 in place. Various non-conductive elements such as sleeves and housings, may be employed to surround various parts of the assembly 28 and/or the terminal cup 130, as is known.

From the foregoing, it will be appreciated that a rectifier assembly made according to the invention achieves both radial and axial compactness, thereby achieving the advantages of both and avoiding the associated disadvantages. Rotor size and mass is reduced from prior art rectifier assemblies having axial compactness while at the same time, the diode assembly is in close proximity to the rotational axis of the rotor, such that the components are not subject to the high centrifugal forces found in prior art axially compact assemblies.

At the same time, axial compactness is achieved without any sacrifice in the amount of magnetic material carried by the rotor so as to provide a maximum generating capacity with minimum bulk.

I claim:

1. An axially and radially compact rectifier assembly for incorporation in a rotor of an alternator or the like, comprising:

a pair of generally parallel mounting plates in spaced relation;

each of said plates having three apertures arranged to define an equilateral triangle, the apertures in one plate being nonaligned with the apertures in the other plate;

Six diodes, one for each said aperture, each having a base forming one pole of the electrical circuit of the diode and received in an associated aperture in a corresponding plate to be mounted thereon, each diode further including a terminal forming the other pole of said electrical circuit and directed axially oppositely of the corresponding base;

the spacing between said plates and the orientation of the diodes thereon being such that the terminals of the diodes on one said plate nest between the terminals of the diodes on the other said plate and are in close proximity to but out of contact with the plate other than that on which the associated diode is mounted and all of the terminals are located between said plates;

a pair of thin plate-like busses, one for each mounting plate and in non-electrically conductive abutment therewith, said bases being in electrical contact with the bus associated with the corresponding plate;

circuit means between said plates interconnecting pairs of said terminals to define a full wave rectifier; and means securing said plates in said spaced relation.

2. The rectifier of claim 1 wherein said plates are generally circular and have radially outwardly opening recesses in their peripheries, and further including electrical leads between said plates and connected to one of (a) said busses or (b) said terminals, said leads extending axially outwardly of said plates through said recesses.

3. The rectifier of claim 1 wherein said busses are located between said plates and each includes a terminal for receipt of an electrical lead.

4. An axially and radially compact rectifier assembly for incorporation in a rotor of an alternator or the like, comprising:
a pair of generally parallel mounting plates in spaced relation;
each of said plates having a plurality of apertures arranged to define an equilateral triangle, the apertures in one plate being nonaligned with the apertures in the other plate;
a plurality of diodes, one for each said aperture, each having a base forming one pole of the electrical circuit of the diode and received in an associated aperture in a corresponding plate to be mounted thereon, each diode further including a terminal forming the other pole of said electrical circuit and extending axially oppositely of the corresponding base and axially toward the plate on which the corresponding diode is not mounted,
the spacing between said plates being such that the terminals of the diodes on one said plate nest between the terminals of the diodes on the other said plate and are in close proximity to but out of contact with the plate other than that on which the associated diode is mounted; and
means securing said plates in said spaced relation.

5. An axially and radially compact rectifier assembly for incorporation in a rotor of an alternator or the like, comprising:
a pair of generally parallel mounting planar plates in spaced relation;
each of said plates having three apertures, the apertures in one plate being nonaligned with the apertures in the other plate;
Six diodes, one for each said aperture, each having a base forming one pole of the electrical circuit of the diode and received in an associated aperture in a corresponding plate to be mounted thereon, each diode further including an axially extending terminal forming the other pole of said electrical circuit and directed oppositely of the corresponding base, all of said terminals being disposed between said plates;
the spacing between said plates being such that the terminals of the diodes on one said plate nest between the terminals of the diodes on the other said plate and are in close proximity to but out of contact with the plate other than that on which the associated diode is mounted; and
means securing said plates in said spaced relation.

6. The rectifier of claim 5 wherein the apertures in each plate define an equilateral triangle with the axial alignment of each aperture on one plate being midway between two apertures on the other of said plates.

7. The rectifier of claim 6 wherein said plates are generally circular and wherein said securing means comprise posts extending between said plates near the periphery thereof, said equilateral triangles being centered about the center of the associated plate, each plate having a central aperture through which a conduit is adopted to axially pass.

8. The rectifier of claim 7 wherein at least one of said plates has radially outwardly opening recesses in its periphery through which electrical leads are adapted to pass.

* * * * *